US012415969B2

(12) United States Patent
Abdollahi et al.

(10) Patent No.: US 12,415,969 B2
(45) Date of Patent: Sep. 16, 2025

(54) FISH OIL RECOVERY FROM AQUATIC BIOMASS

(71) Applicant: AQUAFOOD AB, Gothenburg (SE)

(72) Inventors: Mehdi Abdollahi, Gothenburg (SE); Ingrid Undeland, Mölndal (SE)

(73) Assignee: AQUAFOOD AB, Gothenburg (SE)

( * ) Notice: Subject to any disclaimer, the term of this patent is extended or adjusted under 35 U.S.C. 154(b) by 619 days.

(21) Appl. No.: 17/767,401

(22) PCT Filed: Oct. 9, 2020

(86) PCT No.: PCT/SE2020/050967
§ 371 (c)(1),
(2) Date: Apr. 7, 2022

(87) PCT Pub. No.: WO2021/071418
PCT Pub. Date: Apr. 15, 2021

(65) Prior Publication Data
US 2023/0142415 A1 May 11, 2023

(30) Foreign Application Priority Data

Oct. 11, 2019 (SE) .................................. 1951156-7

(51) Int. Cl.
*C11B 13/00* (2006.01)
*A23J 1/04* (2006.01)
(Continued)

(52) U.S. Cl.
CPC .............. *C11B 13/00* (2013.01); *A23J 1/04* (2013.01); *A23L 17/20* (2016.08); *C11B 1/02* (2013.01); *C11B 1/10* (2013.01); *C11B 3/16* (2013.01)

(58) Field of Classification Search
CPC ............ C11B 1/10; C11B 13/00; C11B 3/04; C11B 3/06; C11B 3/16; A23J 1/04; A23L 17/20
See application file for complete search history.

(56) References Cited

U.S. PATENT DOCUMENTS

| 6,005,073 A | 12/1999 | Hultin et al. |
| 2004/0067551 A1 | 4/2004 | Hultin et al. |
| 2016/0355546 A1 * | 12/2016 | Ghorbani ................. C07K 1/36 |

FOREIGN PATENT DOCUMENTS

| CN | 103564067 A | 2/2014 |
| CN | 104273574 * | 1/2015 |

(Continued)

OTHER PUBLICATIONS

Nolsoe et al., The acid and alkaline solubilization process for the isolation of muscle proteins: state of the art, Food Bioprocess Technol., 2009, vol. 2, No. 1, pp. 1-27 (Year: 2009).*
(Continued)

*Primary Examiner* — Yate' K Cutliff
(74) *Attorney, Agent, or Firm* — Christensen O'Connor Johnson Kindness PLLC

(57) ABSTRACT

A method for recovering fish oil from aquatic biomass under cold conditions, the method comprising the steps of; providing an aquatic biomass; producing a minced aquatic biomass by mincing the aquatic biomass; providing an aqueous suspension of the minced aquatic biomass by mixing and/or homogenizing the minced aquatic biomass in an aqueous solution; adjusting the pH of said aqueous suspension to an extreme high pH or an extreme low pH; separating the aqueous suspension into a supernatant comprising a lower density emulsion fraction substantially comprising oil, aqueous solution and emulsified proteins, and a higher density fraction comprising substantially solubilized proteins, and optionally a pellet comprising collagenous components; collecting the lower density emulsion fraction; separating the lower density emulsion fraction into an oil phase and an aqueous phase; and collecting the oil from said oil phase.

19 Claims, 7 Drawing Sheets

(51) Int. Cl.
A23L 17/20 (2016.01)
C11B 1/02 (2006.01)
C11B 1/10 (2006.01)
C11B 3/16 (2006.01)

(56) References Cited

FOREIGN PATENT DOCUMENTS

| CN | 104273574 A | | 1/2015 |
|---|---|---|---|
| GB | 664827 A | | 1/1952 |
| GB | 2428682 | * | 2/2007 |
| GB | 2428682 A | | 2/2007 |
| NL | 6914370 | * | 9/1969 |

OTHER PUBLICATIONS

Aitta, E., Product development using protein isolate produced by pH-shift process from Baltic herring (Clupea Harengus membras), Master's Thesis, University of Turku, Aug. 2019, 66 pages (Year: 2019).*

Okada, T. et al., Recovery and characterization of Sardine oil extracted by pH adjustment, Journal of Agricultural and Food Chemistry, vol. 55, No. 5, pp. 1808-1813 (Year: 2007).*

Examination Report mailed Nov. 17, 2023, issued in corresponding Canadian Patent Application No. 3,157,257, filed Oct. 9, 2020, 4 pages.

Nolsøe et al., "The Acid and Alkaline Solubilization Process for the Isolation of Muscle Proteins: State of the Art", Food Bioprocess Technology 2(1):1-27, Mar. 2009.

Okada et al., "Recovery and Characterization of Sardine Oil Extracted by pH Adjustment", J. Agric. Food Chem., 55, p. 1808-1813, Feb. 2007.

Extended European Search Report mailed Sep. 22, 2023, issued in corresponding European Patent Application No. 20875571.1, filed Oct. 9, 2020, 11 pages.

International Search Report and Written Opinion mailed Oct. 26, 2020, issued in corresponding International Patent Application No. PCT/SE2020/050967, filed Oct. 9, 2020, 17 pages.

Abdollahi, M., and I. Undeland, "A Novel Cold Biorefinery Approach for Isolation of High Quality Fish Oil in Parallel with Gel-Forming Proteins," Food Chemistry 332 (2020) 127294, available online Jun. 11, 2020, 10 pages.

Aitta, E., "Product Development Using Protein Isolate Produced by pH-Shift Process from Baltic Herring (Clupea harengus membras)," Master's thesis in Technology, University of Turku, Department of Biotechnology, Aug. 2019, 66 pages.

Chen, Y-C., et al., "Amino Acid, Fatty Acid, and Mineral Profiles of Materials Recovered from Rainbow Trout (Oncorhynchus mykiss) Processing By-Products Using Isoelectric Solubilization/Precipitation," Journal of Food Science vol. 72, No. 9, Nov./Dec. 2007, pp. 528-536.

Gehring C.K. et al. Functional and Nutritional Characteristics of 1-20 Proteins and Lipids Recovered by Isoelectric Processing of Fish By-Products and Low-Value Fish: A review, Food Chem, vol. 124, Issue 2, Jan. 2011, pp. 422-431.

Nurdiani, R., et al. Sustainable Use of Marine Resources—Turning Waste into Food Ingredients, Int J Food Sci Technol, vol. 59, Issue 11, Nov. 2015, pp. 2329-2339.

Shi, L., et al. Mass Balance for Isoelectric Solubilization/Precipitation of Carp, Chicken, Menhaden, and Krill, LWT—Food Science and Technology, vol. 81, Aug. 2017, pp. 26-34.

Tahergorabi, R., and J. Jaczynski. Isoelectric Solubilization/Precipitation as a Means to Recover Protein and Lipids from Seafood By-products, in Kim SK. (ed) Seafood Processing By-Products: Trends and Applications, c. 2014, New York, pp. 101-123.

Taskaya L et al. 'Compositional Characteristics of Materials Recovered from Whole Gutted Silver Carp (Hypophthalmichthys molitrix) Using Isoelectric Solubilization/Precipitation', J Agric Food Chem, 2009, vol. 57, pp. 4259-4266, Apr. 2009.

Office Action mailed Aug. 30, 2024, issued in corresponding Canadian Patent Application No. 3,157,257, filed Oct. 9, 2020, 5 pages.

Petursson, S. et al., "Stabilization of Oil-in-Water Emulsions by Cod Protein Extracts", J. Agric. Food Chern., 52(12):3996-4001, May 13, 2004.

* cited by examiner

FISH OIL RECOVERY FROM AQUATIC BIOMASS

TECHNICAL FIELD

The present invention relates to a method for recovering of high-quality omega-3 grade fish oil from an aquatic biomass under cold conditions. The invention further relates a high-quality omega-3 grade fish oil and optionally high-quality gel-forming proteins obtainable by said method and to the use thereof.

BACKGROUND

Currently, the industrial available process to produce fish oil is the classic combined fish meal/fish oil production process also called wet reduction. In this process, fish oil is produced as a co-product during cooking (at 95-100° C. for 15-30 min) of ground fish material, said cooking followed by decanting. The oil obtained as above undergoes heating which could cause oxidation and possibly reduction of the Omega-3 content. To be used for human consumption, the obtained oil has to undergo subsequent costly refining steps. However, there is also a risk that the high temperatures and chemical treatments used during the refining process cause a loss of oil quality. Further, the fish meal (a dried protein-rich fraction) obtained with the above process is not suitable for human consumption due to its poor functionality, lower biological value and non-optimal sensory qualities.

Another process for production of fish oil is enzymatic hydrolysis. This process, similar to the wet reduction, is conducted at a somewhat elevated temperature, i. e. a temperature of from 40 to 60° C. Therefore, it can be questioned whether the fish oil produced by the enzymatic hydrolysis contains no highly oxidized lipids. Furthermore, the protein fraction produced during the process is a hydrolysate comprising peptides which have no gel-forming capacity or independent gel-forming capacity.

Other known processes for production of fish oil are supercritical $CO_2$-assisted extraction and ultrasound-assisted extraction. These processes are designed for dried fish raw material and therefore require a costly and energy-demanding step and expensive equipment.

The above processes are largely intended for use of the whole fish and cannot meet the globally increasing demand in omega-3 as the traditional pelagic whole fish resources are dramatically reduced and primarily used for direct human consumption.

Currently, a large part of our marine resources is under-utilized, and seafood industries generate 50-70% (w/w) of their total processed raw material as by-products, which currently goes to low price ingredients such as mink feed, fish meal and silage or even become wasted. These by-products include for example heads, tails, viscera, backbones and shells, and their annual global production amounts to 42-44 million metric tons. Around half the weight of these by-products is however prime quality muscle tissue e. g. rich in long-chain omega-3 fatty acids and high-quality proteins.

Noteworthy, a process used for direct recovery of high-quality protein retaining their gel-forming abilities from unconventional complex raw materials such as fish processing by-products is the so-called pH-shift method. This process involves selectively extracting proteins from a suspension of a homogenized raw material using a high pH (≥10.5) or a low pH (<3.5) to solubilize the muscle proteins, and then centrifugating the suspension to separate the solubilized proteins from a low-density fraction and an undissolved material. This process has been widely investigated as a tool for producing food-grade high-quality gel-forming proteins from fish processing by-products. However, up to now, the pH-shift process has not been used for isolating food-grade fish oil from the suspension of the homogenized raw material due to the emulsion nature of the resulting suspension, which is heat-stable, and has been suggested for use only as a fish feed ingredient.

U.S. Pat. No. 7,763,717 discloses a process for recovering protein and lipid from animal by-products or krill, wherein antifoam agents are added during the process. The patent document is primarily aimed at the recovery of proteins. The recovered lipid needs further refinement.

Thus, there is a need for an improved and sustainable method, requiring no hazardous chemicals and costly or energy-demanding step or equipment, for recovering a fish oil and optionally a protein, the oil and protein being immediately suitable for human consumption, i. e. without requiring any further purification.

SUMMARY

In the light of the above, it is an object of the present inventive concept to provide a method for recovering high-quality omega-3 grade fish oil from an aquatic biomass under cold conditions, a high-quality omega-3 grade fish oil and optionally a protein obtainable by said method and use of the oil and optionally the protein obtainable by said method in food products, food supplements and pharmaceutical products. Said inventive concept alleviates at least part of the above-discussed problems and at least partially addresses one or more of the above-mentioned needs. Furthermore, another object of the present invention is to avoid addition of for example anti emulsifying agents and anti-foaming agents or any other chemicals during the process, which may harm the produced oil and protein.

According to a first aspect of the inventive concept there is provided a method for recovering fish oil from an aquatic biomass under cold conditions, the method comprising steps of:

providing an aquatic biomass;
producing a minced aquatic biomass by mincing the aquatic biomass,
providing an aqueous suspension of the minced aquatic biomass by mixing and/or homogenizing the minced aquatic biomass in an aqueous solution,
adjusting the pH of said aqueous suspension to an extreme high pH or an extreme low pH,
separating the aqueous suspension into a supernatant comprising a lower density emulsion fraction substantially comprising oil, water and emulsified proteins, and a higher density fraction comprising substantially solubilized proteins, and optionally a pellet comprising collagenous components,
collecting the lower density emulsion fraction,
separating the lower density emulsion fraction into an oil phase and an aqueous phase, and
collecting the oil from said oil phase.

For the person skilled in the art, it is apparent that one or more of the above steps may be combined, and performed together.

The method of the invention makes it possible to produce high-quality fish oil rich in omega-3 fatty acids as well as high-quality gel forming proteins from aquatic biomass, eg fish by-products, under cold conditions without heat and environmentally hazardous chemicals. In addition, the present method makes it possible for full utilization of the aquatic biomass resource leading to almost zero waste.

The above method may comprise optionally freezing the minced or whole aquatic biomass and defrosting said minced or whole aquatic biomass before providing an aqueous solution.

The extreme high pH may be from about 9 to 13, preferably 11 to 13, eg 11.5, 12, 12.5 or 13. The slightly lower level of pH 9 to 10 may be used when technologies such as ultrasound is used. The level of free fatty acid (FFA) in exemplary fish oils, such as salmon oil and herring oil, recovered with the alkaline version of the inventive method had 70 and 30-fold lower levels of FFA, respectively, compared to the oils extracted with prior art heat treatment. Furthermore, for exemplary oils, salmon oil and herring oil, extracted using the alkaline version of the pH-shift process resulted in a 3-fold lower amount of hydroperoxides compared with that resulted in the classic heating method.

The extreme low pH may be from 2 to 3.5.

The separation of the lower density emulsion fraction may comprise freezing the lower density emulsion fraction and subsequent thawing said frozen lower density emulsion fraction, said thawing followed by centrifugation.

The separation of the lower density emulsion fraction may comprise adjusting the pH of the lower density emulsion fraction to about the isoelectric point of the proteins, said adjusting the pH followed by centrifugation.

The separation of the lower density emulsion fraction may comprise freezing the lower density emulsion fraction and subsequent thawing said frozen lower density emulsion fraction and adjusting the pH of the lower density emulsion fraction to about the isoelectric point of the proteins, the above followed by centrifugation.

There may be provided recovery of proteins by collecting the higher density fraction comprising solubilized proteins, separating the higher density fraction under cold conditions into a supernatant and a pellet comprising the proteins, and collecting the proteins from the pellet.

The above cold conditions may be defined by a temperature of from about 0° C. to about 14° C., preferably from about 4° C. to about 10° C. It may also be around room temperature. The person skilled in the art realizes that the temperature may be chosen in such a way that the lower density fraction obtained with the above method is not physically solid at the chosen temperature. This would assure that a higher amount of oil could be obtained within the lower density fraction during the separating of the aqueous suspension.

The separation of the higher density fraction may comprise adjusting the pH of the higher density fraction to about the isoelectric point of the solubilized proteins.

The said adjusting of the pH of the higher density fraction to about the isoelectric point of the solubilized proteins may be followed by centrifugation or filtering of the higher density fraction.

The isoelectric point of the proteins or/and the solubilized proteins may be from about 3.5 to about 8, preferably about 5.5. Any specific pH in the range may be used, i.e. 4, 5, 6, 7 or 8 or anywhere therein between.

There may be provided a method for recovery of both oil and proteins from the aquatic biomass under cold conditions, wherein the oil and the proteins are recovered from the same aqueous suspension. This method includes any of the above mentioned steps in any combination.

The proteins recovered with the above method may retain their gel-forming properties.

The collagenous components may be recovered.

The aquatic biomass may be fish.

The aquatic biomass may be fish filleting by-products, such as head, tail, backbone, skin, flap, viscera, gut, roe, blood or any combination thereof.

The aquatic fishery matter may originate from white muscle lean fish, dark muscle fatty fish, salmonid fish or any combination thereof. The aquatic biomass may be raw or in any other form, for instance heated, smoked or cooked. The aquatic biomass may originate from salmon, herring, cod, mackerel, pilchard, trout, albacore, anchovy, sardine and tuna or any other fatty fish species.

The aquatic biomass may be a combination of the before mentioned fish or any other fish known to the skilled person.

According to another aspect of the inventive concept there is provided an oil and optionally a protein obtainable by the method discussed in the foregoing.

According to yet another aspect of the inventive concept there is provided a use of the oil and optionally the protein obtainable by the method discussed in the foregoing in food products, food supplements and pharmaceutical products. The oil can be directly used as omega-3 source and avoid classic refining steps used in fish oil produced using the classic heating process.

It will be appreciated that the above-mentioned embodiments of the first aspect of the present inventive concept also apply to the further aspects of the present inventive concept.

These and other aspects of the invention will be apparent from and elucidated with reference to the embodiments described hereinafter.

BRIEF DESCRIPTION OF THE DRAWINGS

For exemplifying purposes, the inventive concept will be described in closer detail in the following with reference to embodiments thereof illustrated in the attached drawings, wherein.

DETAILED DESCRIPTION OF PREFERRED EMBODIMENTS

Figure 1:
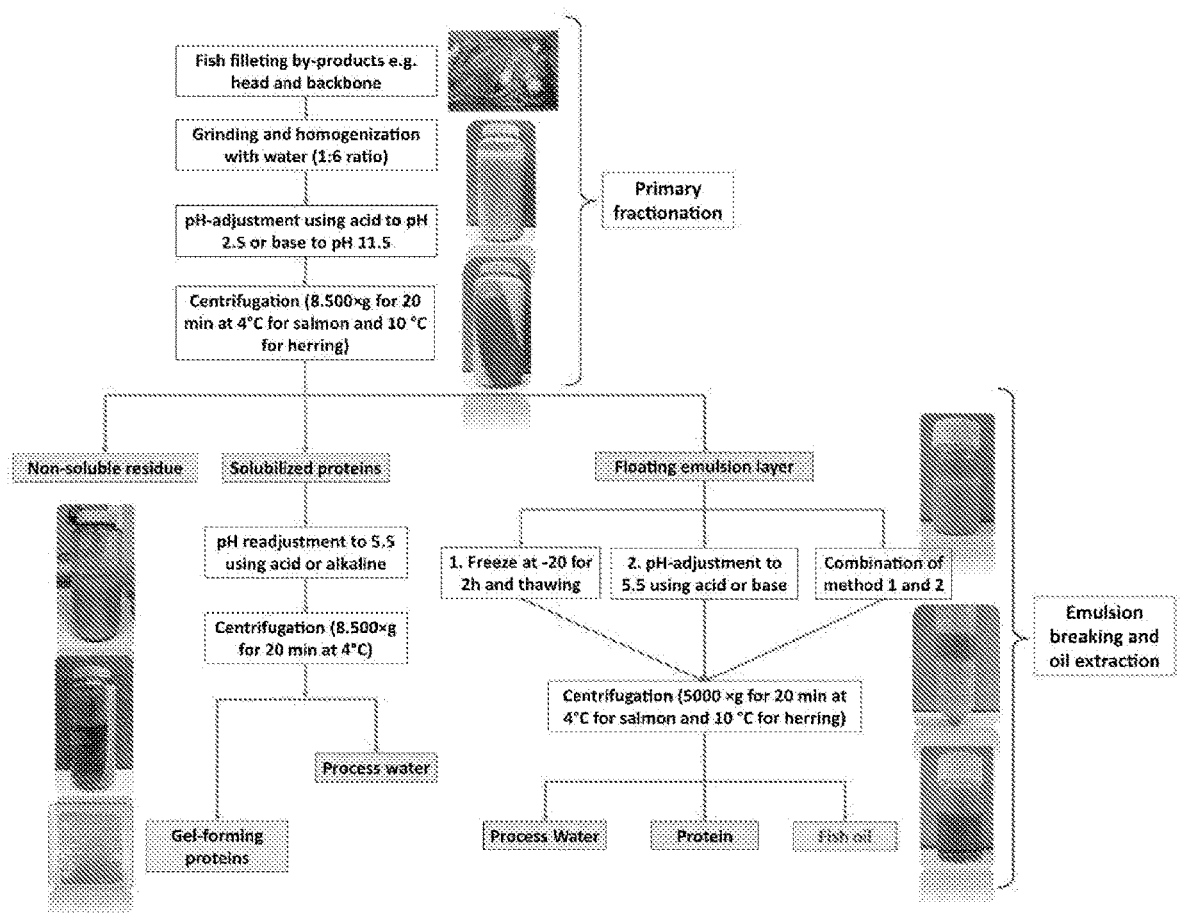
FIG. 1 schematically illustrates an overview of production of a fish oil and optionally a protein from an aquatic biomass under cold conditions according to the invention. Floating emulsion layer is another word used for the lower density layer as defined herein.

In the following detailed description, the technical terms and expressions are defined and preferred embodiments of the inventive concept are described.

Generally, all terms and expressions used in the application text are to be interpreted according to the meaning commonly applied to the them in the pertinent prior art, unless explicitly defined otherwise herein.

As used in this specification and the appended claims, the singular forms "a", "an" and "the" include plural referents unless the context clearly dictates otherwise. Thus, for example reference to "a protein" includes one or more proteins, reference to "an oil" includes one or more oils and the like.

The steps of any method disclosed herein do not have to be performed in the exact order disclosed, unless explicitly stated. The term "aquatic biomass" is understood within the scope of the inventive concept to refer to an aquatic material originated from the sea or fresh water resources or farmed in salt or fresh water having a fatty content, the biomass being an entity engaged in raising and/or harvesting any aquatic non-mammal animal such as fish, mollusks and crustaceans or any other species having a fatty content.

The term "mince" is understood within the scope of the inventive concept to refer to any form of disintegrating the aquatic biomass, with or without added water, such as grinding, cutting or crushing the biomass.

The term "fish oil" is understood within the scope of the inventive concept to refer to an oil originated from any aquatic non-mammal animal such as fish, mollusks and crustaceans. The terms "fish oil" and "oil" are used interchangeably throughout the application text.

The term "pH-shift method" is understood within the scope of the inventive concept to refer to adjusting the pH of an aqueous suspension of a minced aquatic biomass to an extreme high pH or an extreme low pH.

The term "lower density emulsion fraction" is understood within the scope of the inventive concept to refer to a supernatant fraction of a lower density, the fraction being formed after centrifugating of an aqueous suspension of a minced aquatic biomass. Said lower density emulsion fraction is an emulsion system ("oil-in-water" emulsion) comprising an oil phase and an aqueous phase, wherein the aqueous phase has a larger volume than the oil phase, as well as emulsified proteins. There may be proteins which precipitate out of the lower density emulsion fraction. The lower density fraction is on top of the higher density fraction.

The term "emulsified protein" is understood within the scope of the inventive concept to refer to a protein which is found within the lower density emulsion fraction after centrifugating of an aqueous suspension of a minced aquatic biomass.

The term "higher density fraction" is understood within the scope of the inventive concept to refer to a supernatant fraction of a higher density, the fraction being formed after centrifugating of an aqueous suspension of a minced aquatic biomass. Said higher density fraction comprises an aqueous solution and a protein with becomes substantially solubilized in the aqueous solution. The higher density fraction is heavier than the lower density fraction and is therefore found below the lower density fraction after centrifugation.

The term "isoelectric point of the protein" is understood within the scope of the inventive concept to refer to the isoelectric point of the protein, or to the isoelectric point of the combination of proteins.

The inventive concept has mainly been described above with reference to a few embodiments. However, as is readily appreciated by a person skilled in the art, other embodiments than the ones disclosed above are equally possible within the scope of the invention, as defined by the appended patent claims.

EXAMPLES

FIG. 1 schematically illustrates an overview of production of a fish oil and optionally a protein in accordance with few embodiments of the present inventive concept. Fresh filleting by-products of salmon (*Salmo salar*) and herring (*Clupea harengus*) including head and tail on backbone were provided by Fisk Idag AB (Gothenburg, Sweden) and Scandic Pelagic AB (Ellös, Sweden), respectively. The by-products were covered with ice immediately after processing of the fish and transported to the marine lab at Chalmers University of Technology, where the by-products were grinded (prior to this project) in a table-top mincer with 4.5 mm holes (C/E22 N, Minerva Omega group, Italy) and stored at −80° C. in plastic zip-lock bags.

Chemicals used: sodium hydroxide, hydrochloric acid, trichloroacetic acid (TCA), and sodium chloride were provided by Scharlau (Scharlau Co., Spain); hexane, diethyl ether, acetic acid, isooctane were purchased from Sigma-Aldrich Corp (USA); all other used chemicals were reagent grade.

The minced by-products from salmon and herring were subjected to the pH-shift process separately. After defrosting the minced fish by-products under cold running tap water, 200 g of the by-products were mixed with 1200 mL of cold dH$_2$O and then were homogenized with a Polytron homogenizer (IKA, Germany) at 15,000 rpm for 90 s to provide an aqueous suspension. To facilitate separation of soluble proteins, fat and collagenous components in the aqueous suspension, the pH of the aqueous suspension was adjusted to an extreme acidic (2.5) or alkaline (11.5) pH by adding 2 M HCl or 2 M NaOH, respectively. The process of the adjusting the pH to an extreme acidic pH is referred below as the acid process version of the pH-shift process. The process of the adjusting the pH to an extreme alkaline pH is referred below as the alkaline process version of the pH-shift process. The above pH-shift process was performed automatically using a titrator (907 Titrando, Metrohn AG, Zurich, Switzerland), where the pH was monitored by a Hamilton double pore electrode (Bonaduz, Switzerland). The aqueous suspension was incubated on ice for 10 min and then centrifuged at 8,500×g at 4° C. for 20 min. The centrifugation generated a supernatant, comprising a lower density emulsion fraction comprising mainly oil, aqueous solution and emulsified proteins and a higher density fraction comprising substantially solubilized proteins, and a pellet comprising collagenous components. The lower density emulsion fraction was collected from the aqueous suspension using a metal sieve and was then weighed and immediately used for separating the lower density emulsion fraction into an oil phase and an aqueous phase.

The collected lower density emulsion fractions obtained from herring by-products and salmon by-products, respectively, were subjected to different green methods to extract the oil without using organic solvents or heating. The lower density emulsion fraction is an emulsion system made of aqueous solution, oil and emulsified proteins. Said emulsion system has most likely been formed during the mixing and/or grinding and/or homogenizing the minced aquatic biomass in an aqueous solution.

According to one embodiment of the present inventive concept, freezing the lower density emulsion fraction and subsequent thawing said frozen lower density emulsion fraction (i. e. freezing/thawing) was conducted. The above freezing/thawing induced protein denaturation and subsequently phase separation under cold conditions (<4° C.). The collected lower density emulsion fractions were frozen at −20° C. for 2 h and then were defrosted under running cold tap water. The defrosted samples were then immediately centrifugated at 5,000 g at 4° C. for 10 min and the pure fish oil emerged in the supernatant was collected and weighed.

According to another embodiment of the present inventive concept, the pH of the lower density emulsion fraction was adjusted to about the isoelectric point (pI) of the emulsified proteins, e. g. pI=5.5. At the isoelectric point (pI) proteins usually show their minimum emulsion activity at a temperature of ≤4° C. The adjusting of the pH was performed by using 1 N NaOH or HCl. Afterwards, the samples were immediately centrifugated at 5,000 g at 4° C. for 10 min and pure fish oil in the supernatant was collected and weighed.

According to yet another embodiment of the present inventive concept, when the acid process version of the pH-shift process was used, a combination of the freezing/thawing and pH-adjustment was used, which provided for higher recovery of oil from the lower density emulsion fraction compared to that obtained with either the freezing/thawing or the pH-adjustment alone. 30 g of each lower density emulsion fraction was first frozen at −20° C. for 2 h, defrosted under running cold tap water, and then the pH of lower density emulsion fraction was adjusted to about the isoelectric point of the emulsified proteins, e. g. pI=5.5. Afterwards, the samples were immediately centrifugated at 5,000 g at 4° C. (for salmon) or 10° C. (for herring) for 10 min and pure fish oil in the supernatant was collected and weighed.

Effect of oil extraction and purification temperature was also studied in herring for the lower density emulsion fraction since herring oil was physically solid at ≤4° C. This could potentially prohibit oil migration to the lower density emulsion fraction during the separation of the aqueous suspension using the pH-shift method and subsequent oil recovery. Thus, the method for recovering a fish oil from herring was conducted at 10° C.

Fish oil was also directly extracted from herring by-products and salmon by-products using the conventional cooking method as control according the method explained by Okada & Morrissey (2007). 200 g of the by-products from each fish species were mixed with 100 ml of water and then heated at 90° C. for 30 min. Manual mixing was performed during the heating. Then, it was centrifugated at 5,000 g at 4° C. (for salmon) or 10° C. (for herring) for 10 min and pure fish oil was collected from the supernatant and weighed.

Total oil yield was calculated based on the weight of the extracted fish oil ($W_{extracted\ oil}$) to the initial weight of the by-products ($W_{by\text{-}product}$) (equation 1). Oil yield was also calculated based on the oil weight in the by-products ($W_{oil\ in\ by\text{-}product}$) (equation 2), oil in the lower density emulsion fraction ($W_{oil\ in\ lower\ density\ emulsion\ fraction}$) (equation 3) and oil in the initial by-products ($W_{oil\ in\ by\text{-}products}$) (equation 4)

$$\text{Total yield}(\%) = \frac{\text{Weight of extracted oil}}{\text{Initial weight of by-product}} \times 100 \quad (1)$$

$$\text{Yield 1}(\%) = \frac{\text{Weight of oil in lower density emulsion fraction}}{\text{Initial weight of oil in by-product}} \times 100 \quad (2)$$

$$\text{Yield 2}(\%) = \frac{\text{Weight of extracted oil}}{\text{Weight of oil in \textit{ower} density emulsion fraction}} \times 100 \quad (3)$$

$$\text{Yield 3}(\%) = \frac{\text{Weight of extracted oil}}{\text{Initial weight of oil in by-product}} \times 100 \quad (4)$$

Total fat content in the by-product and corresponding lower density emulsion fraction were measured gravimetrically according the method of Lee, Trevino, & Chaiyawat (995) as modified by Undeland, Hultin, & Richards (2002).

Figure 2:
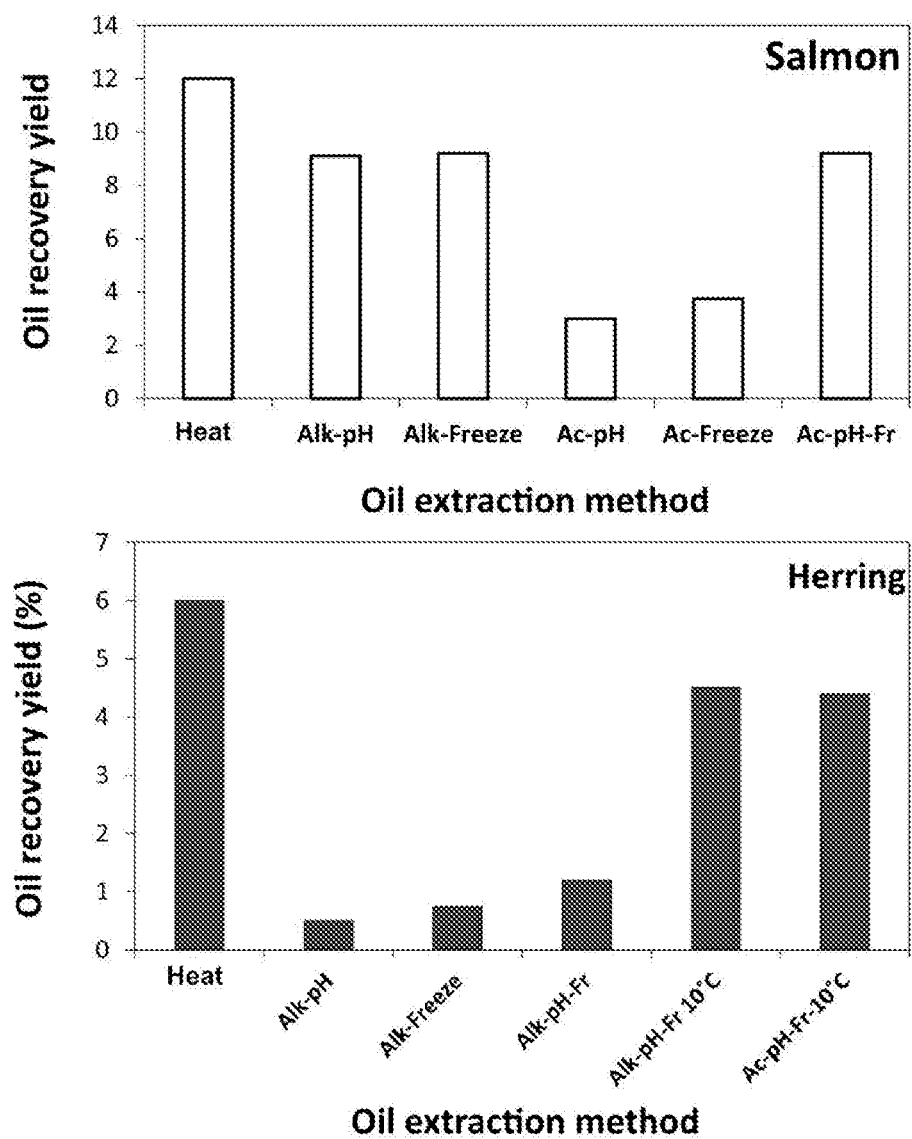
FIG. 2 diagrammatically illustrates fish oil recovery yield from salmon and herring, respectively, by-products using the method according to the present inventive concept and conventional cooking, respectively. Fish oil recovery yield (%) from salmon and herring filleting by-products using the inventive cold methods compared with the conventional method (heat). Alk-pH: oil recovered using alkaline version of the process in combination with pH-adjustment of the lower density layer. Alk-Freeze: oil recovered using alkaline version of the process with aid of freeze/thawing of the lower density layer. Alk-pH-Fr: oil recovered using alkaline version of the process with the aid of combination of pH-adjustment and freeze/thawing of the lower density layer. Ac-pH: oil recovered using acid version of the process in combination with pH-adjustment of the lower density layer. Acid-Freeze: oil recovered using acid version of the process with aid of freeze/thawing of the lower density layer. Acid-pH-Fr: oil recovered using acid version of the process with the aid of combination of pH-adjustment and freeze/thawing of the lower density layer.

Lipid classes of the oils recovered using the pH-shift process and cooking method were separated and determined using thin layer chromatography (TLC) according the method explained by Gigliotti, Davenport, Beamer, Tou, & Jaczynski (2011). The extracted fish oils were dissolved in hexane solution (30% solution, v/v). Then, an aliquot of 1 µL of sample mixture was loaded onto the silica plate (TLC silica gel 60G F254, 200×200×0.25 mm, Merck, Germany) using a capillary tube. The plate was developed using a mobile phase of hexane/diethyl ether/acetic acid (60:40:2, volume basis). The plate was then left to dry for 5 min. Afterwards, the spots were visualized by spraying 5% sulfuric acid aqueous solution followed by drying at 100° C. on a hot plate for 30 min. Lipid classes were identified using a standard mixture made of lecithin, cholesterol, oleic acid and triolein. Finally, the gel was scanned in a GS-800 Calibrated Densitometer (Bio-Rad, USA) and the obtained picture analyzed using the program Quantity One® (Bio-Rad, USA). At least three replicate TLC plates were run per sample and a representative image of the three replicates is shown in FIG. 2.

Fish oil samples were initially methylated by following the method described by Cavonius et al. (2014). After methylation the samples were evaporated under nitrogen gas and then resolubilized by adding 1.0 ml of isooctane. The samples were diluted and were subjected to GC-MS analysis using an Agilent 7890 A GC system (Agilent Technologies, Santa Clara, USA) equipped with a VF-wax column and interfaced with an Agilent 5975 C triple-axis mass spectrometric (MS) detector in electron impact mode. Injection volume was 1 µl with a 15:1 split at an inlet temperature of 275° C. as described by Hinchcliffe, Gunnar, Jönsson, Sundell, & Undeland, (2019).

Peroxide value (PV) was measured according to the procedure described by Shantha & Decker (1994) with slight modifications. Initially, a fish oil sample (0.1-0.3 g) was added to 9.7 ml of ice-cold chloroform:methanol (7:3 v/v) mixture. Then, 50 µL of ammonium thiocyanate solution, made by dissolving 7.5 g ammonium thiocyanate in 25 mL $dH_2O$, was added to the sample. After that, the sample was mixed with 50 µL of iron-chloride solution made by mixing equal amounts of 0.2 g $BaCl_2 \cdot 2H_2O$, dissolved in 25 mL 0.4 M HCl and 0.1 g $FeSO_4 \cdot 7H_2O$ dissolved in 10 mL $dH_2O$. The samples were vortexed quickly and incubated at room temperature for 20 min. Absorbance of the samples was measured at 500 nm using a UV-visible spectrophotometer and compared to a standard curve of cumene hydroperoxide (CPO) in the range of 0-20 µM, Appendix C. Blanks were used consisting of 1 mL chloroform.

TBARS were measured by a modified version of the method described by Schmedes & Hølmer (1989). First, TBA solution was made by dissolving 0.5 g of thiobarbituric acid in 100 mL of TCA solution (12.5 g trichloroacetic acid dissolved in 250 mL $dH_2O$). Then, 0.025-0.05 g of fish oil was dissolved in 2.5 mL TBA solution and boiled for 30 min (n=2, n—number of replicates). The tubes were cooled under running tap water, where after they were vortexed quickly and degassed. All samples were then centrifugated at 3,000 g for 3 min to obtain clear solutions. Absorbance of the solutions was measured at 532 nm using a UV-visible spectrophotometer and compared to a standard curve of malondialdehyde (MDA) in the range of 0-10 µM. Blanks were made using 2.5 mL methanol:water (10:9) and, as in PV analysis, corrections were made for color interferences by excluding addition of TBA solution.

Total amount of free fatty acids (FFA) in fish oil samples was measured according the method reported by Lowry & Tinsley (1976), with minor modifications. Briefly, 0.1 g of each fish oil sample was weighed in 15 ml glass tubes and dissolved in 5.0 ml cyclohexane while vortexing. Then, 1.0 ml of the cupric reagent was added to the tubes and vortexed for at least 90 s followed by incubation for 1 min. The tubes were then centrifugated at 2,000 g for 10 min and absorbance of upper layer was measure at 710 nm using spectrophotometer.

Overall color of the protein isolates obtained from the pH-shift processing was measured as described by Abdollahi, Marmon, Chaijan, & Undeland (2016), using a Minolta colorimeter (CR-400, Konica Minolta Sensing, Japan). Ten ml of each oil sample were poured into a transparent 15 ml container, and the container was then placed on top of the colorimeter probe and five measurements were made from different part of the samples by moving the plate. Values were obtained in the CIE L*a*b* color space, namely lightness (L*) and tendency towards red or green (a*) and blue or yellow (b*).

Statistical analysis was performed for tests with groups using SPSS software (IBM SPSS Statistics Version 24, IBM Inc., Chicago). One-way analysis of variance (ANOVA) was carried out to determine significant differences between groups, followed by Duncan's multiple range test. Significance level was set at 0.05, below which the differences were considered significant.

Oil recovery yield from salmon by-products and herring by-products using the method according to the present inventive concept and conventional cooking is shown in FIG. 2. For both salmon and herring, the highest amount of oil could be recovered by the cooking method was 12% and 6% (w oil/w of by-product), respectively. For salmon by-products, freezing/thawing and adjusting the pH of the lower density emulsion fraction produced using the alkaline version of the pH-shift process to the pI resulted in 9% (w oil/w of by-product) of oil recovery.

However, when the adjusting the pH to the pI and freezing/thawing were separately applied to the lower density emulsion fraction recovered from salmon by-product using the acid version of the pH-shift process, the oil could not be efficiently recovered. This could be related to the higher emulsion activity of fish proteins extracted at acidic conditions due to the higher degree of denaturation that usually happens during the acid process version of the pH-shift process and are not fully recoverable by the pHreadjustment to the pI. The adjusting the pH of the lower density emulsion fraction or freezing/thawing leads to the minimization of electrostatic charges of the proteins and proteins aggregation. As a result, the proteins begin to precipitate out of the solution, which limits emulsion type interactions and facilitates the recovery of the oil from the lower density emulsion fraction by centrifugation force.

However, when the lower density emulsion fraction obtained using the acid version of the pH-shift process was subjected to the adjusting of the pH to the pI and freezing/thawing, the resulted oil recovery was of 9% (w oil/w of by-product).

In contrast to salmon, the adjusting the pH, freezing/thawing and/or their combination could not efficiently recover the oil from herring lower density emulsion fraction produced during the alkaline and/or acid process version of the pH-shift process. However, increasing the temperature of the pH-shift process and oil extraction processes to 10° C. resulted in 4.6% oil recovery when a combination of the adjusting the pI and freezing/thawing was used for the separating of the aqueous suspension. This was mainly because the herring fat was physically solid at temperature <5° C. Using higher temperature allowed having the herring fats in the liquid form and facilitated fat extraction from the emulsion.

Figure 3:
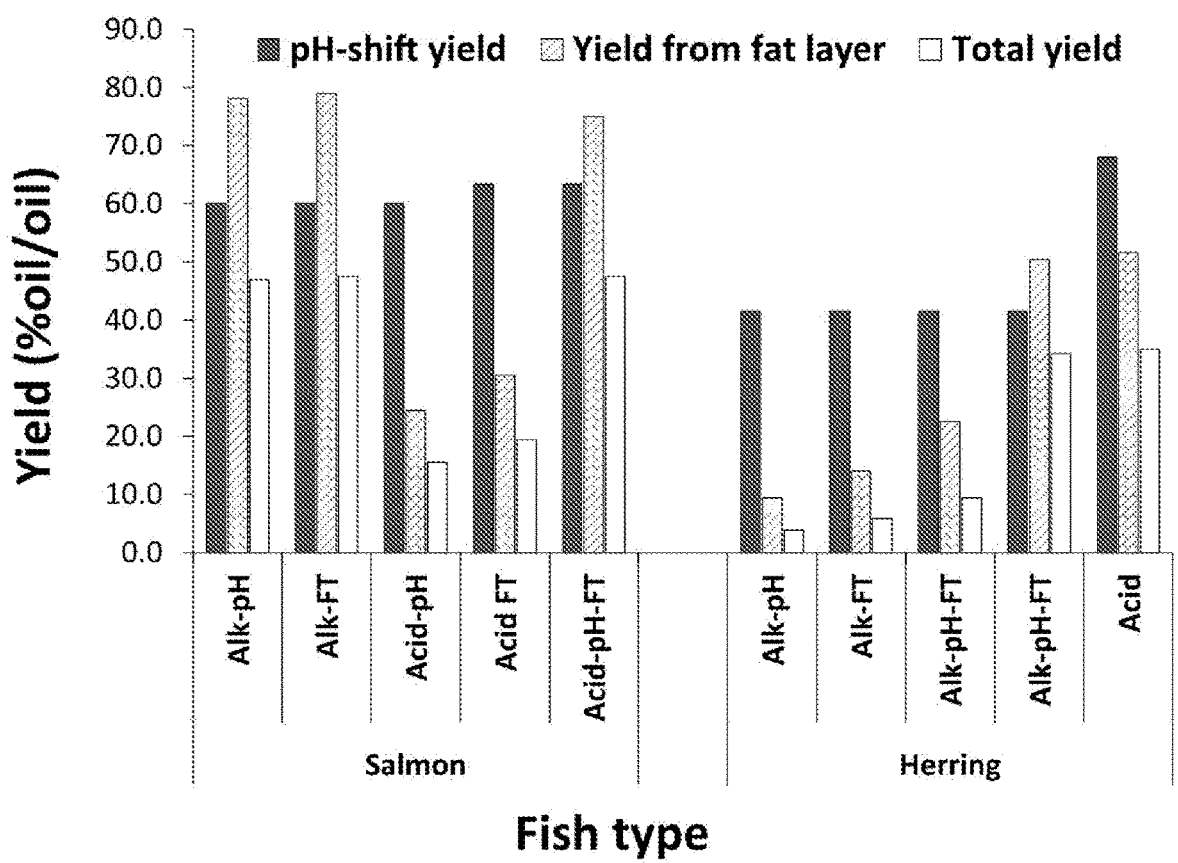
FIG. 3 diagrammatically illustrates oil distribution to the fat layer (pH-shift yield), oil recovery from fat layer (yield from fat layer) and total oil recovery yield from salmon and herring by-product using the pH-shift process version in combination with different emulsion breaking methods. Alk-pH: oil recovered using alkaline version of the process in combination with pH-adjustment of the lower density layer. Alk-FT: oil recovered using alkaline version of the process with aid of freeze/thawing of the lower density layer. Alk-pH-FT: oil recovered using alkaline version of the process with the aid of combination of pH-adjustment and freeze/thawing of the lower density layer. Acid-FT: oil recovered using acid version of the process with aid of freeze/thawing of the lower density layer. Acid-pH-FT: oil recovered using acid version of the process with the aid of combination of pH-adjustment and freeze/thawing of the lower density layer. Acid: oil recovered using acid version of the process with the aid of combination of pH-adjustment and freeze/thawing of the lower density layer.

Oil recovery yield by the pH-shift process, oil recovery yield from the lower density emulsion fraction by secondary oil purification and total yield based on the initial amount of oil in the fish by-products are also shown in FIG. 3. In general, the pH-shift process in both process versions could more efficiently collect lipids into the low density emulsion fraction in salmon (60-63%) than in herring (41-68%). Further, the acid version of the pH-shift process was more effective than the alkaline version of the pH-shift process in separating the oil from the proteins in both species.

Oil recovery yield from the lower density emulsion fraction in the form of pure oil was in general significantly higher in salmon (74-79%) compared to that in herring (50-51%). The results for the total oil recovery yield based on the initial oil content of input materials also shows that the pH-shift process and the developed techniques for the separation of the aqueous suspension have been able to recover not more than 47% and 35% of oil from salmon by-products and herring by-products, respectively.

Compositions of lipids in the oil recovered from salmon by-products and herring by-products, respectively, are shown in FIG. 3. As can be seen, triglycerides (TG) were the major components (79-93%) and cholesterol was the second most abundant constituents of the oils extracted with both heat and the pH-shift process from both raw materials. However, the percentage of TGs was significantly higher in oil recovered from both salmon by-products and herring by-products using the claimed method compared with that of the oils recovered with the heating method. The amount of free fatty acids (FFA) and monoglycerides (MG) in the recovered oils showed a reverse tendency with significantly lower levels in the oils recovered using the claimed method compared to those recovered using the conventional cooking, or heating process (FFA=3.1-3.5%). There was no significant difference between the levels of cholesterol in oils recovered with different methods. However, oil recovered using heat showed relatively higher content of phospholipids (PL) compared to oils extracted using the claimed method. This suggests that phospholipids are mainly distributed in fractions other than the lower density emulsion fraction, i. e. in the higher density fraction comprising solubilized proteins and/or the pellet, due to their amphiphilic properties. Protein denaturation and coagulation caused by heating could probably minimize interactions of the phospholipids with the proteins and facilitate phospholipid recovery.

The process version of the pH-shift method also significantly affected the lipid classes in the oil recovered from salmon and herring, respectively. Oil recovered with the aid of the alkaline version of the pH-shift process showed significantly higher levels of TGs compared to the oil recovered with the aid of the acid version of the pH-shift process (FFA=2.9-3.1%) for both salmon and herring. FFA were not detected in the oil recovered using with the aid of the alkaline version of the pH-shift process but FFA were present in the oil recovered with the acid version of the pH-shift process (FFA=2.9-3.1%). In addition, the oil recovered using the alkaline version of the pH-shift process showed lower levels of PL compared to the oil recovered with the acid version of the pH-shift process. The choice of a technique used for the separation of the aqueous suspension significantly affected lipid composition of the oil recovered from salmon by-products, i. e. the oil recovered using the freezing/thawing showed significantly higher amount of TG (92%) compared to the oil recovered using the adjusting the pH to the pI (85%).

Fatty acid composition of oils extracted from salmon by-products and herring by-products, respectively, using the claimed method and heat is summarized in Table 1. Oleic acid (C18:1 n9) and erucic acid (C22:1n9) were the most abundant fatty acids in oils recovered from salmon by-products and herring by-products, respectively. Monounsaturated fatty acids (MUFA) were in general the most abundant fatty acids in the oil recovered from salmon by-products and herring by-products, respectively. Oils recovered with the claimed method had slightly higher amount of polyunsaturated fatty acids (PUFA) and significantly more omega-3 fatty acids than the oils recovered with heat for both salmon and herring.

TABLE 1

Fatty acid composition of the oil recovered by the claimed method and conventional cooking (heat) from salmon by-products and herring by-products, respectively.

| Fatty acids (g/100 g lipids) | Salmon oil | | | | Herring oil | | |
|---|---|---|---|---|---|---|---|
| | Alkaline-pH | Alkaline-FT | Acid | Heat | Alkaline | Acid | Heat |
| C12:0 | ND | ND | ND | ND | 0.07 ± 0.00 | 0.07 ± 0.01 | 0.06 ± 0.01 |
| C13:0 | ND | ND | ND | ND | 0.03 ± 0.00 | ND | ND |
| C13:1 | ND | ND | ND | ND | 0.02 ± 0.00 | ND | ND |
| C14:0 | 1.53 ± 0.06 | 1.57 ± 0.09 | 1.74 ± 0.11 | 1.70 ± 0.07 | 6.59 ± 0.09 | 5.79 ± 1.32 | 5.46 ± 0.68 |
| C14:1n5 | ND | ND | ND | ND | 0.03 ± 0.02 | 0.10 ± 0.01 | ND |

TABLE 1-continued

Fatty acid composition of the oil recovered by the claimed method and conventional cooking (heat) from salmon by-products and herring by-products, respectively.

| Fatty acids (g/100 g lipids) | Salmon oil | | | | Herring oil | | |
|---|---|---|---|---|---|---|---|
| | Alkaline-pH | Alkaline-FT | Acid | Heat | Alkaline | Acid | Heat |
| C15:0 | 0.12 ± 0.00 | 0.12 ± 0.01 | 0.13 ± 0.01 | 0.12 ± 0.01 | 0.36 ± 0.00 | 0.33 ± 0.04 | 0.35 ± 0.04 |
| C16:0 | 9.48 ± 0.39 | 9.57 ± 0.0.14 | 9.85 ± 0.62 | 9.32 ± 0.25 | 11.40 ± 0.20 | 10.69 ± 1.25 | 11.11 ± 1.32 |
| C16:1n7 | 2.24 ± 0.08 | 2.29 ± 0.00 | 1.17 ± 1.53 | 2.20 ± 0.09 | 4.27 ± 0.06 | 3.99 ± 0.44 | 3.86 ± 0.46 |
| C16:2n4 | 0.07 ± 0.4 | 0.04 ± 0.63 | 0.12 ± 0.01 | 0.11 ± 0.01 | 0.37 ± 0.00 | 0.22 ± 0.14 | 0.34 ± 0.04 |
| C17:0 | 10.32 ± 0.72 | 10.63 ± 0.01 | 10.17 ± 0.96 | 9.37 ± 0.01 | 9.34 ± 0.27 | 10.12 ± 0.63 | 9.76 ± 0.38 |
| C16:3n4 | 0.05 ± 0.00 | 0.05 ± 0.00 | 0.06 ± 0.00 | 0.06 ± 0.00 | 0.21 ± 0.01 | 0.19 ± 0.02 | 0.19 ± 0.02 |
| C17:1 n7 | 0.06 ± 0.01 | 0.07 ± 0.15 | 0.07 ± 0.00 | 0.07 ± 0.01 | 0.11 ± 0.00 | 0.11 ± 0.01 | 0.10 ± 0.01 |
| C18:0 | 2.37 ± 0.09 | 2.39 ± 0.14 | 2.47 ± 0.15 | 2.35 ± 0.05 | 0.78 ± 0.03 | 0.71 ± 0.09 | 0.75 ± 0.08 |
| C18:1 n9 | 47.93 ± 1.62 | 49.46 ± 3.14 | 50.66 ± 0.27 | 47.93 ± 1.23 | 11.95 ± 0.73 | 10.25 ± 1.53 | 10.09 ± 0.93 |
| C18:1 n7 | 6.91 ± 0.25 | 6.87 ± 0.78 | 7.24 ± 0.41 | 7.14 ± 0.20 | 2.11 ± 0.08 | 1.92 ± 0.22 | 1.89 ± 0.19 |
| C18:2 n6 | 5.50 ± 1.25 | 3.54 ± 0.02 | 6.92 ± 0.43 | 6.57 ± 0.11 | 1.23 ± 0.09 | 1.03 ± 0.15 | 1.01 ± 0.08 |
| C18:3 n6 | 0.03 ± 0.04 | 0.04 ± 0.05 | 0.07 ± 0.01 | 0.07 ± 0.02 | 0.05 ± 0.01 | 0.04 ± 0.01 | 0.05 ± 0.00 |
| C19:0 | ND | ND | ND | ND | 0.03 ± 0.00 | 0.03 ± 0.00 | 0.03 ± 0.00 |
| C19:1 | ND | ND | ND | ND | 0.03 ± 0.00 | 0.03 ± 0.00 | ND |
| C18:3 n3 | 14.29 ± 0.56 | 15.16 ± 0.41 | 15.54 ± 1.08 | 14.21 ± 0.49 | 3.92 ± 0.21 | 3.52 ± 0.44 | 3.42 ± 0.33 |
| C20:0 | 0.15 ± 0.01 | 0.18 ± 0.01 | 0.18 ± 0.00 | 0.19 ± 0.03 | 0.08 ± 0.00 | 0.08 ± 0.01 | 0.09 ± 0.02 |
| C20:1 n15/13 | 1.01 ± 1.57 | 0.11 ± 0.00 | 0.12 ± 0.01 | 0.11 ± 0.01 | 0.54 ± 0.01 | 0.49 ± 0.10 | 0.45 ± 0.05 |
| C20:1 n9 | 2.60 ± 1.33 | 3.59 ± 0.26 | 3.68 ± 0.26 | 3.44 ± 0.15 | 9.52 ± 0.10 | 8.97 ± 1.00 | 8.87 ± 1.06 |
| C20:2 n6 | 0.50 ± 0.36 | 0.75 ± 0.05 | 0.77 ± 0.06 | 0.69 ± 0.09 | 0.11 ± 0.01 | 0.09 ± 0.02 | 0.09 ± 0.01 |
| C20:4 n6 | 0.09 ± 0.01 | 0.08 ± 0.01 | 0.09 ± 0.00 | 0.08 ± 0.00 | 0.12 ± 0.01 | 0.12 ± 0.02 | 0.11 ± 0.00 |
| C20:3 n3 | 0.15 ± 0.10 | 0.10 ± 0.01 | 0.19 ± 0.11 | 0.15 ± 0.07 | 0.07 ± 0.01 | 0.06 ± 0.02 | 0.04 ± 0.01 |
| C20:4 n3 | 0.29 ± 0.08 | 0.26 ± 0.02 | 0.33 ± 0.07 | 0.30 ± 0.07 | 0.32 ± 0.00 | 0.29 ± 0.04 | 0.28 ± 0.03 |
| C20:5 n3 (EPA) | 1.28 ± 0.09 | 1.39 ± 0.09 | 1.32 ± 0.23 | 1.27 ± 0.013 | 3.39 ± 0.03 | 3.16 ± 0.37 | 3.04 ± 0.36 |
| C22:1 n9 | 1.02 ± 0.07 | 1.06 ± 0.09 | 1.06 ± 0.06 | 0.98 ± 0.07 | 14.26 ± 0.12 | 13.48 ± 1.61 | 13.33 ± 1.61 |
| C22:5 n3 | 0.36 ± 0.07 | 0.36 ± 0.04 | 0.37 ± 0.01 | 0.31 ± 0.13 | 0.21 ± 0.01 | 0.19 ± 0.05 | 0.18 ± 0.01 |
| C22:6 n3 (DHA) | 1.66 ± 0.08 | 1.72 ± 0.12 | 1.78 ± 0.09 | 1.47 ± 0.22 | 4.16 ± 0.02 | 3.90 ± 0.47 | 3.37 ± 0.08 |
| Total SFA | 23.96 ± 0.20 | 24.46 ± 1.47 | 24.54 ± 1.63 | 22.83 ± 0.39 | 28.82 ± 0.05 | 27.96 ± 2.10 | 27.71 ± 2.55 |
| Total MUFA | 59.52 ± 2.03 | 61.15 ± 4.28 | 62.83 ± 4.01 | 59.65 ± 1.33 | 42.85 ± 1.12 | 39.35 ± 4.82 | 38.59 ± 4.31 |
| Total PUFA | 27.63 ± 2.78 | 27.01 ± 0.76 | 27.25 ± 1.73 | 25.31 ± 1.14 | 13.59 ± 0.34 | 12.41 ± 1.59 | 11.94 ± 1.25 |
| Total Omega-3 | 18.04 ± 0.73 | 19.00 ± 0.69 | 19.29 ± 1.21 | 17.71 ± 0.96 | 12.08 ± 0.25 | 11.12 ± 1.38 | 10.33 ± 0.65 |
| Total Omega-6 | 10.41 ± 2.08 | 7.91 ± 0.08 | 7.84 ± 0.50 | 7.40 ± 0.22 | 1.51 ± 0.09 | 1.28 ± 0.20 | 1.25 ± 0.10 |

The oil recovered from herring by-products with the alkaline version of the pH-shift method had slightly higher amount of total PUFA and omega-3 PUFA, in contrast to the oil recovered from salmon by-products with the same method. The highest amounts of eicosapentaenoic acid (EPA) and docosahexaenoic acid (DHA) were found in herring oils extracted with the alkaline version of the pH-shift method (EPA=3.39 and DHA=4.16 g/100 g). The alkaline version of the pH-shift method could help in recovering higher amount of PUFA and omega-3 compared with what could be recovered with heat.

Figure 4:
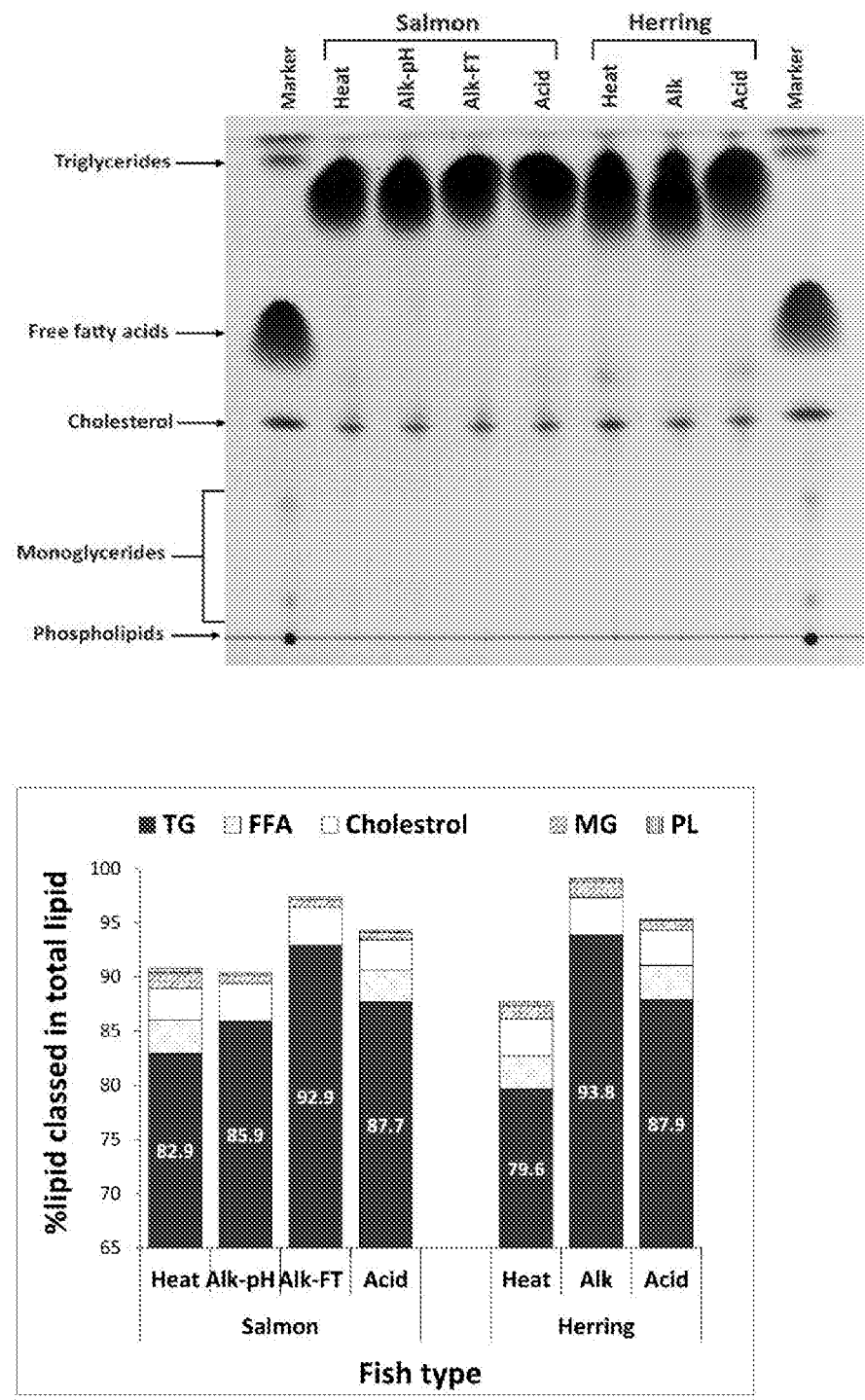
FIG. 4 illustrates lipid compositions of the salmon oil and herring oil, each recovered by the method according to the present inventive concept and conventional cooking (heat), respectively. Lipid compositions of salmon and herring oils extracted by conventional (heat) method and pH-shift method in combination with different emulsion breaking methods. Alk-pH: oil recovered using alkaline version of the process in combination with pH-adjustment of the lower density layer. Alk-FT: oil recovered using alkaline version of the process with aid of freeze/thawing of the lower density layer. Alk: oil recovered using alkaline version of the process with the aid of combination of pH-adjustment and freeze/thawing of the lower density layer. Acid: oil recovered using acid version of the process with the aid of combination of pH-adjustment and freeze/thawing of the lower density layer.
Figure 5:
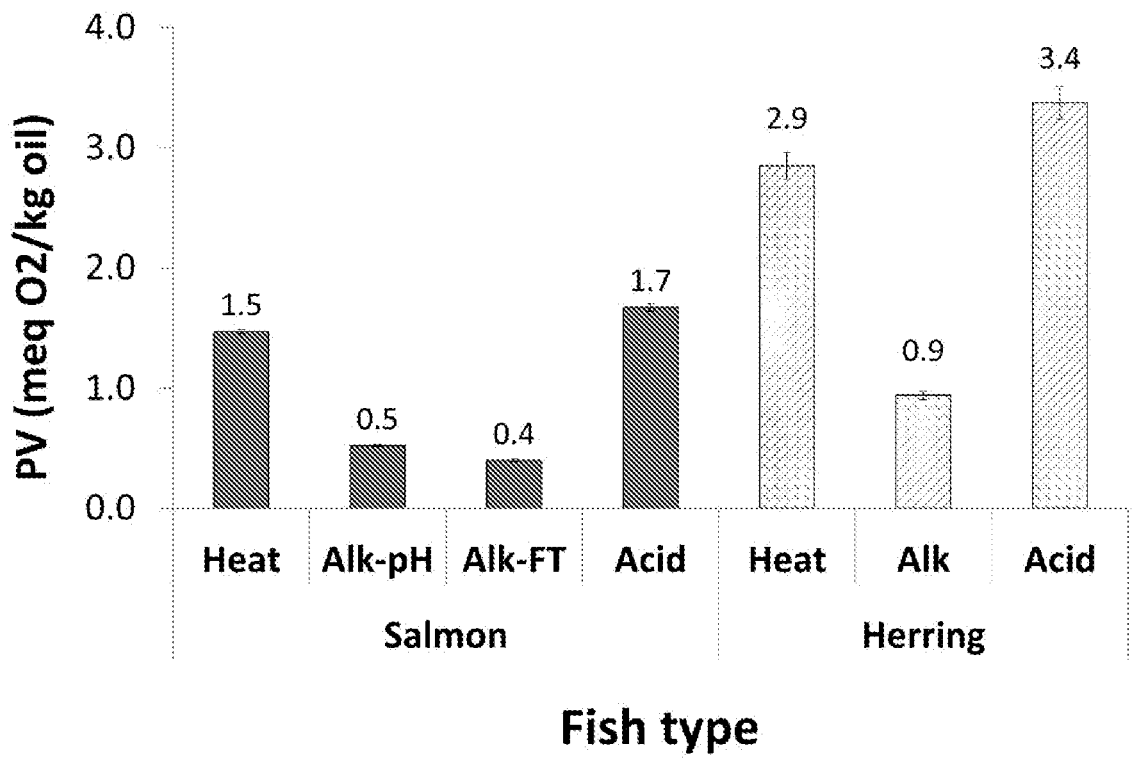
FIG. 5 diagrammatically illustrates peroxide values (PV) of the salmon oil and herring oil, each recovered using the method according to the present inventive concept and the conventional cooking (heat), respectively. Primary lipid oxidation products measured as peroxide value (PV) in salmon and herring oils extracted by conventional (heat) method and pH-shift method in combination with different emulsion breaking methods. Alk-pH: oil recovered using alkaline version of the process in combination with pH-adjustment of the lower density layer. Alk-FT: oil recovered using alkaline version of the process with aid of freeze/thawing of the lower density layer. Alk: oil recovered using alkaline version of the process with the aid of combination of pH-adjustment and freeze/thawing of the lower density layer. Acid: oil recovered using acid version of the process with the aid of combination of pH-adjustment and freeze/thawing of the lower density layer.
Figure 6:
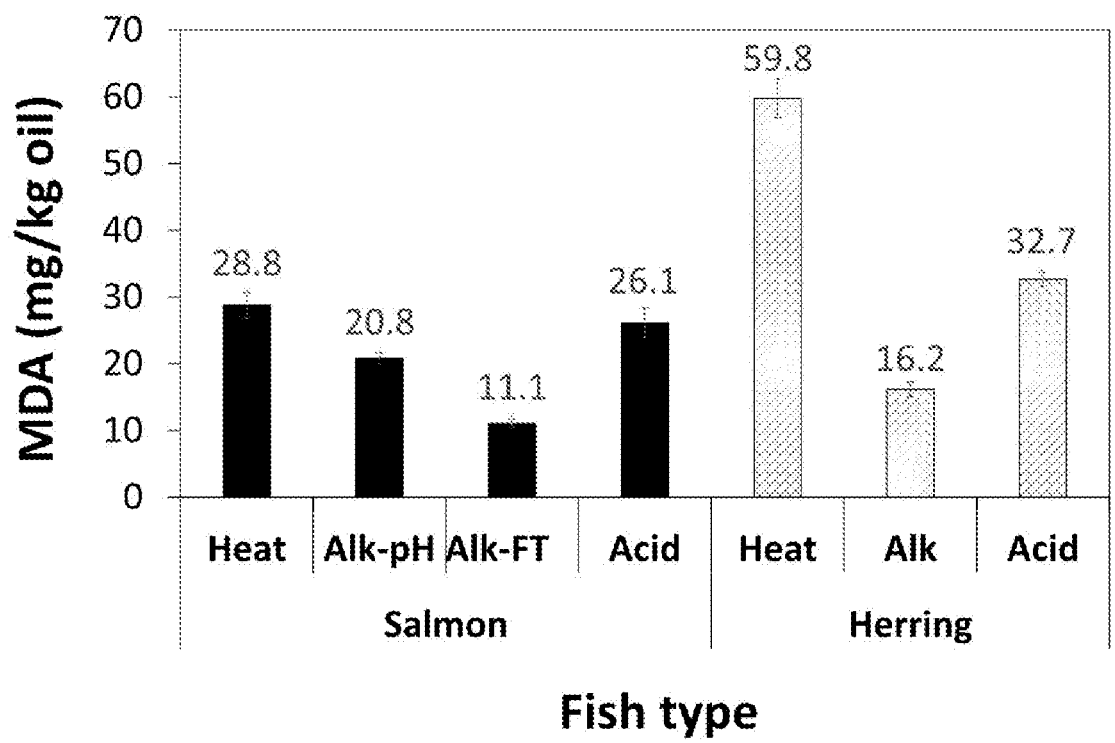
FIG. 6. diagrammatically illustrates thiobarbituric acid reactive substances (TBARS) (MDA %) of the salmon oil and herring oil, each recovered using the claimed method and conventional cooking (heat), respectively. Secondary lipid oxidation products as TBARS by measuring malondialdehyde (MDA) in salmon and herring oils extracted by conventional (heat) method and pH-shift method in combination with different emulsion breaking methods. Alk-pH: oil recovered using alkaline version of the process in combination with pH-adjustment of the lower density layer. Alk-FT: oil recovered using alkaline version of the process with aid of freeze/thawing of the lower density layer. Alk: oil recovered using alkaline version of the process with the aid of combination of pH-adjustment and freeze/thawing of the lower density layer. Acid: oil recovered using acid version of the process with the aid of combination of pH-adjustment and freeze/thawing of the lower density layer.
Figure 7:
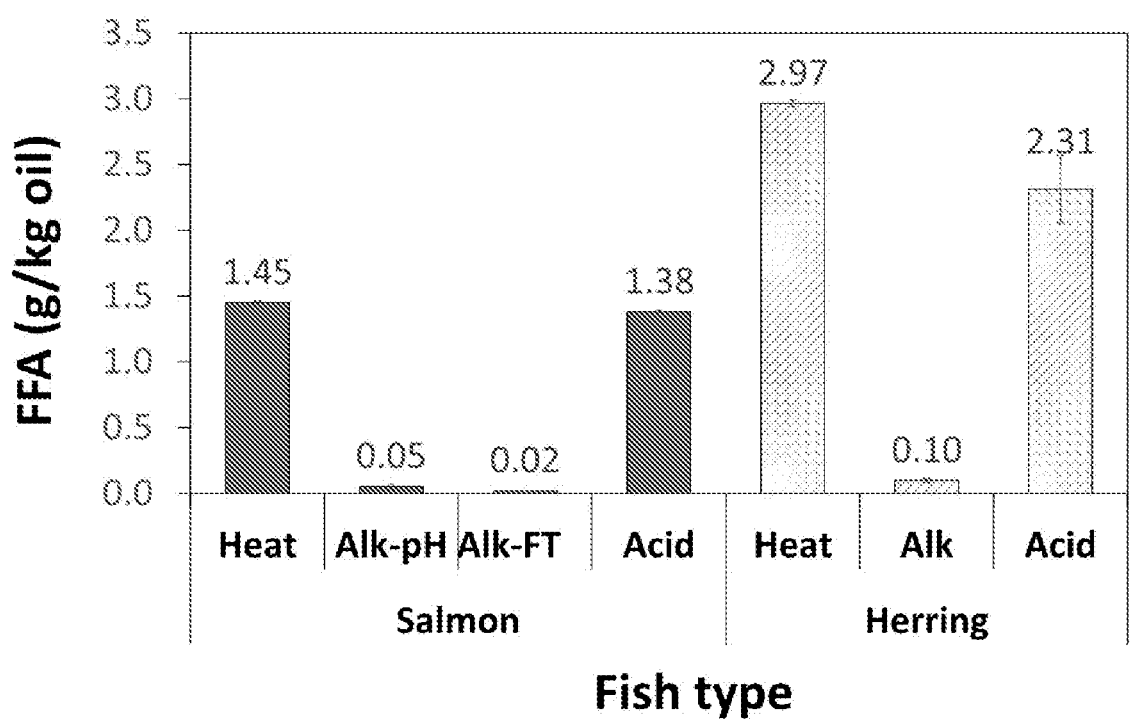
FIG. 7. Lipid hydrolysis degree measured as the amount of free fatty acids (FFA) in salmon and herring oils extracted by conventional (heat) method and pH-shift method in combination with different emulsion breaking methods. Alk-pH: oil recovered using alkaline version of the process in combination with pH-adjustment of the lower density layer. Alk-FT: oil recovered using alkaline version of the process with aid of freeze/thawing of the lower density layer. Alk: oil recovered using alkaline version of the process with the aid of combination of pH-adjustment and freeze/thawing of the lower density layer. Acid: oil recovered using acid version of the process with the aid of combination of pH-adjustment and freeze/thawing of the lower density layer.

Primary oxidation products in the oils recovered from salmon by-products and herring by-products, respectively, were measured by PV analysis and are shown in FIG. 4. The type of raw material and oil recovery method used had a big impact on the PV of the oils. The oil recovered from herring by-products (PV=0.3-1.6 meq/kg) had significantly higher PV levels than the oil recovered from salmon by-products (PV=0.9-3.3 meq/kg). The lower levels of primary lipid oxidation products in salmon oils might be due to carotenoids naturally exist in salmon oil that can act as antioxidant. For both salmon oil and herring oil, alkaline version of the pH-shift process resulted in a 3-fold lower amount of hydroperoxides compared with that resulting from the heating method. Since a higher PV at the beginning of the storage period has a negative impact on the storage stability of the oil industry intend to produce oils with PV as low as possible, without the formation of secondary reaction products. For refined oils, producers should aim for a peroxide value below 1, better 0.5 meq $O_2$/kg oil, while the peroxide value for virgin oils can be higher, up to 3 meq $O_2$/kg oil. Here, the alkaline version of the pH-shift process could reduce the generated level of PV in salmon oil down to 0.3 meq/kg and in herring oil down to 0.9 meq/kg. Formation and decomposition of hydroperoxides can be influenced by several factors including temperature, light, lipid class composition and presence of pro-oxidants or antioxidants. When fish by-products are used for oil recovery, heating process can denature heme-proteins e. g haemoglobin and myoglobin and release the heme group or the iron into the surrounding environment. These irons can interact with the lipid membranes and induce lipid oxidation. On the other hand, doing the alkaline version of pH-shift process and the subsequent separation of the aqueous suspension has substantially mitigated the oxidation reactions and on top of that helped to maintain natural antioxidants in fish muscle by avoiding their destruction.

However, oils recovered with the acid version of the pH-shift process showed significantly higher levels of PV compared with oils recovered with heat for both salmon and herring ($p<0.05$). This could be the due to the prooxidative potential of heme-pigments available in muscle, which could have denatured at low pH.

Secondary lipid oxidation products in the recovered oil were determined by measuring TBARS and the results are shown in FIG. 4. Levels of TBARS in the oil showed a pattern similar to PV with significantly higher levels in oils recovered with heat. In both salmon and herring, alkaline version of the pH-shift produced oils with almost 2-fold lower amounts of TBARS compared to the heat-based method. The lowest level of TBARS was measured in salmon oil recovered using the alkaline version of the pH-shift method isolated with the freezing/thawing which was 11.1 mg MDA-equivalents/kg oil. Under heating hydroperoxide are decomposed into secondary oxidation products such as aldehydes, ketones, acids and alcohols that are measured as TBARS. The pH-shift process was conducted at low temperature (<10° C.) to reduce lipid oxidation with minimizing formation and decomposition of hydroperoxide and with retaining natural antioxidants. The lower lipid oxidation in the oils recovered with the claimed method could be due to the lower amounts of phospholipids in these oils as shown by TLC which are the most important substrates in lipid oxidation in fish which are in in cellular membranes and can be in direct contact with aqueous pro-oxidants.

Generally, fish by-products contain high levels of autolytic activities and PUFA content that are prone to both lipolysis and lipid oxidation. The amount of FFA in the extracted fish oil is an indication of lipolysis caused by activity of endogenous lipases during the extraction process that leaded to formation of FFA. It is recommended that FFA in high quality fish oil should not exceed the limit of 2-5% of FFA. Oils recovered from both salmon and herring had very low amount of FFA (0.002-0.3%), which shows high quality of the used raw materials and the extracted fish oils. However, oils recovered from herring had almost 2-fold higher levels of FFA compared to salmon oils regardless of extraction method which could be due to well-known high enzymatic activity in pelagic fish e.g. herring which cause quick rancidity in these resources. The level of FFA in the salmon oil and herring oil recovered with the alkaline version of the pH-shift method had 70 and 30-fold lower levels of FFA, respectively, compared to the oils extracted with heat. This coincides with the substantially higher percentage of FFA found by TLC for the oils extracted with heat. It is expected that application of high temperature inactivates endogenous lipolytic enzymes. However, it has been shown that high activity of the lipolytic enzymes at their optimum temperature experienced before reaching the inactivation temperatures (>80° C.) leads formation of FFA. The released FFA are highly susceptible to lipid oxidation during the extraction process due to the presence of double bonds, which are more packed when in TAG. This might also partly explain high levels oxidation found in these oil samples. Processing at low temperature when the alkaline version of the pH-shift process was used could effectively minimize lipolysis, but the acid version of the pH-shift process caused high level FFA formation in the fish oils, in line with the results found by TLC.

The color of the oil is an important physical attribute that define its quality since dark-colored oil need high cost refine processing to achieve an acceptable light-colored product. All salmon oils showed an orange appearance reflected in their positive a* value (4.5-5.5), which can be due to due to higher levels of pigments such as astaxanthin. Herring oils had a yellowish appearance. Both oils had a medium level of lightness (L=62-66). The extraction method clearly affected on the color of the oils. For both types of fish, oils extracted with heat showed slightly higher L* value (lightness) than oils extracted with the claimed method. Salmon oils recovered with the claimed method showed significantly higher a* value compared with the oil extracted with heat, and maximum redness was measured in salmon oil recovered with the aid of the alkaline version of the pH-shift process and freezing/thawing which can reflect higher content of pigments in these oils. Herring oils extracted with the claimed method showed lower b* values but higher a* value (less greenish).

The invention claimed is:

1. A method for recovering fish oil from aquatic biomass under cold conditions, the method comprising the steps of:
   providing an aquatic biomass;
   producing a minced aquatic biomass by mincing the aquatic biomass, providing an aqueous suspension of the minced aquatic biomass by mixing and/or homogenizing the minced aquatic biomass in an aqueous solution,
   adjusting the pH of said aqueous suspension to an extreme high pH of from 9 to 13 or an extreme low pH of 2 to 3.5,
   separating the aqueous suspension into a supernatant comprising a lower density emulsion fraction substantially comprising oil, aqueous solution and emulsified proteins, and a higher density fraction comprising substantially solubilized proteins, and optionally a pellet comprising collagenous components,
   collecting the lower density emulsion fraction,
   separating the lower density emulsion fraction into an oil phase and an aqueous phase, and
   collecting the oil from said oil phase,
   wherein said cold conditions are defined by a temperature of from 0° C. to room temperature without heating;
   wherein the separating of the lower density emulsion fraction comprises:
   freezing the lower density emulsion fraction and subsequently thawing said frozen lower density emulsion fraction, or
   adjusting the pH of the lower density emulsion fraction to about the isoelectric point of the proteins, or a combination thereof,
   followed by centrifugation.

2. The method according to claim 1, the method comprising freezing the aquatic biomass, or minced aquatic biomass, and defreezing said aquatic biomass, or minced aquatic biomass, before providing an aqueous solution.

3. The method according to claim 1, wherein the extreme high pH is from about 11 to about 13.

4. The method according to claim 1, the method further comprising recovery of proteins comprising the steps of:
   collecting the higher density fraction comprising solubilized proteins, separating the higher density fraction under cold conditions into a supernatant and a pellet comprising the proteins, and
   collecting the proteins from the pellet.

5. The method according to claim 1, wherein said cold conditions are defined by a temperature of from about 0° C. to about 14° C.

6. The method according to claim 4, wherein separation of the higher density fraction comprises adjusting the pH of the higher density fraction to about the isoelectric point of the solubilized proteins.

7. The method according to claim 6, wherein the adjusting of the pH of the higher density fraction is followed by centrifugation or filtration of the higher density fraction.

8. The method according to claim 6, wherein the isoelectric point of the proteins or/and the solubilized proteins is from about 3.5 to about 8.

9. A method for recovery of oil and proteins from the aquatic biomass under cold conditions, the method comprising the steps as described in claim 1, wherein the oil and the proteins are recovered from the same aqueous suspension.

10. The method according to claim 1, wherein the emulsified proteins recovered with the method retain their gel-forming properties.

11. The method according to claim 1, the method further comprising recovering the collagenous components.

12. The method according to claim 1, wherein the aquatic biomass is fish.

13. The method according to claim 1, wherein the aquatic biomass are fish filleting by-products.

14. The method according to claim 1, wherein the aquatic biomass originates from white muscle lean fish, dark muscle fatty fish, salmonid fish or any combination thereof.

15. The method according to claim 1, wherein the aquatic biomass originates from salmon, herring, cod, mackerel, pilchard, trout, albacore, anchovy, sardine or tuna or any other fatty fish species.

16. The method according to claim 15, wherein the aquatic biomass is any combination of salmon, or trout.

17. The method according to claim 5, wherein said cold conditions are defined by a temperature of from about 4° C. to about 10° C.

18. The method according to claim 8, wherein the isoelectric point of the proteins or/and the solubilized proteins is about 5.5.

19. The method according to claim 13, wherein the aquatic biomass are fish filleting by-products selected from head, tail, backbone, skin, flap, viscera, gut, roe, blood, or any combination thereof.

* * * * *